(12) United States Patent
Endo et al.

(10) Patent No.: US 8,208,802 B2
(45) Date of Patent: Jun. 26, 2012

(54) FOCUSING POSITION DETERMINING APPARATUS, IMAGING APPARATUS AND FOCUSING POSITION DETERMINING METHOD

(75) Inventors: Yuki Endo, Yokohama (JP); Toshiyuki Tanaka, Yokohama (JP); Toshihiro Hamamura, Yokohama (JP); Tsuyoshi Moriya, Yokohama (JP); Naoki Takafuji, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 12/548,570

(22) Filed: Aug. 27, 2009

(65) Prior Publication Data
US 2010/0054722 A1     Mar. 4, 2010

(30) Foreign Application Priority Data
Aug. 27, 2008  (JP) .................. 2008-218609

(51) Int. Cl.
*G03B 3/00*  (2006.01)
(52) U.S. Cl. ........................... 396/89; 396/98
(58) Field of Classification Search .......... 396/64, 396/98, 80, 79, 104, 237, 89; 348/356
See application file for complete search history.

(56) References Cited

U.S. PATENT DOCUMENTS

| | | | | |
|---|---|---|---|---|
| 5,854,948 A * | 12/1998 | Tsukada | ...................... | 396/93 |
| 7,515,820 B2 * | 4/2009 | Nakai et al. | .................... | 396/125 |
| 7,546,030 B2 * | 6/2009 | Ito et al. | ............................ | 396/79 |
| 7,719,603 B2 * | 5/2010 | Lee | ................................... | 348/345 |
| 7,796,182 B2 * | 9/2010 | Konishi | ........................ | 348/345 |
| 2004/0057713 A1 | 3/2004 | Ishikawa et al. | | |
| 2004/0202461 A1 * | 10/2004 | Nakahara | ....................... | 396/104 |
| 2006/0171699 A1 * | 8/2006 | Nakai et al. | .................... | 396/125 |
| 2006/0232698 A1 | 10/2006 | Ito et al. | | |
| 2008/0199174 A1 * | 8/2008 | Yoshida | ........................ | 396/257 |
| 2009/0028539 A1 * | 1/2009 | Nakahara | ....................... | 396/104 |
| 2009/0268075 A1 * | 10/2009 | Yumiki | .................... | 348/333.05 |

(Continued)

FOREIGN PATENT DOCUMENTS

JP         2003-279838 A      10/2003

(Continued)

OTHER PUBLICATIONS

Office Action established for JP 2008-218609 (Mar. 13, 2012).

*Primary Examiner* — Rodney Fuller
*Assistant Examiner* — Linda B Smith
(74) *Attorney, Agent, or Firm* — Drinker Biddle & Reath LLP (57) ABSTRACT

Provided are a focusing position determining apparatus, an imaging apparatus, and a focusing position determining method, the method including setting an aperture to a first aperture value; driving a focus lens through a first range of positions as a first drive; during the first drive, obtaining images periodically, and calculating a first sampling of contrast values from the obtained images; calculating a first focus position from the first sampling of contrast values; setting the aperture to a second aperture value; driving a focus lens through a second range of positions as a second drive, the second range of positions being based on the first focus position; during the second drive, obtaining images periodically, and calculating a second sampling of contrast values from the obtained images; calculating a focusing position from the second sampling of contrast values; and driving the focus lens to the calculated focusing position.

20 Claims, 6 Drawing Sheets

U.S. PATENT DOCUMENTS

2010/0091175 A1 * 4/2010 Shintani et al. ............... 348/345

FOREIGN PATENT DOCUMENTS

| | | |
|---|---|---|
| JP | 2004-109691 A | 4/2004 |
| JP | 2006-113293 A | 4/2006 |
| JP | 2008-096796 A | 4/2008 |
| KR | 1997-0064169 A | 9/1997 |
| KR | 10-2006-0083287 A | 7/2006 |
| KR | 10-2006-0109336 A | 10/2006 |

* cited by examiner

FOCUSING POSITION DETERMINING APPARATUS, IMAGING APPARATUS AND FOCUSING POSITION DETERMINING METHOD

CROSS-REFERENCE TO RELATED PATENT APPLICATIONS

This application claims the benefit of Japanese Patent Application No. 2008-218609, filed on Aug. 27, 2008 in the Japanese Intellectual Property Office, the entire contents of which is herein incorporated by reference.

BACKGROUND OF THE INVENTION

1. Field of the Invention

The present invention relates to a focusing position determining apparatus, an imaging apparatus, and a focusing position determining method.

2. Description of the Related Art

Imaging apparatuses such as digital still cameras include display units such as liquid crystal displays (LCDs). The display unit may display a subject in real time in a video mode before capturing an image of the subject.

The imaging apparatuses also control the focus so that the subject can be focused on an imaging surface of the imaging apparatus. The imaging apparatus needs methods to determine the proper position of a focus lens for obtaining images that appear in focus.

SUMMARY OF THE INVENTION

Accordingly to an embodiment of the invention, a focusing position determining apparatus is provided, comprising: a photoelectric conversion device configured to convert light from a subject incident on an imaging surface into an electric signal; a focus lens configured to focus the light from the subject onto the imaging surface; a contrast value calculating unit configured to calculate a contrast value in an image signal from the electric signal; a focusing position detector configured to determine a focusing position of the focus lens when the light from the subject is focused on the imaging surface by using a peak of the contrast value; a focus lens driving unit configured to drive the focus lens through a first range of positions as a first drive and configured to drive the focus lens through a second range of positions as a second drive, wherein the second range is based on a position of the location of the focus lens where the contrast value is at a peak in the first drive; and an aperture control unit configured to control a quantity of light incident on the imaging surface from the subject during the first drive based on a first predetermined aperture value and configured to control the quantity of light based on an aperture value used when capturing an image in the second drive.

According to a further embodiment of the invention, an imaging apparatus comprising a focusing position determining apparatus is provided, comprising: a photoelectric conversion device configured to convert light from a subject incident on an imaging surface into an electric signal; a focus lens configured to focus the light from the subject onto the imaging surface; a contrast value calculating unit configured to calculate a contrast value in an image signal from the electric signal; a focusing position detector configured to determine a focusing position of the focus lens when the light from the subject is focused on the imaging surface by using a peak of the contrast value; a focus lens driving unit configured to drive the focus lens through a first range of positions as a first drive and configured to drive the focus lens through a second range of positions as a second drive, wherein the second range is based on a position of the location of the focus lens where the contrast value is at a peak in the first drive; and an aperture control unit configured to control a quantity of light incident on the imaging surface from the subject during the first drive based on a predetermined aperture value and configured to control the quantity of light based on an aperture value used when capturing an image in the second drive.

According to a further embodiment of the invention, a focusing position determining method is provided, comprising: setting an aperture to a first aperture value; driving a focus lens through a first range of positions as a first drive; during the first drive, obtaining images periodically, and calculating a first sampling of contrast values from the obtained images; calculating a first focus position from the first sampling of contrast values; setting the aperture to a second aperture value; driving a focus lens through a second range of positions as a second drive, the second range of positions being based on the first focus position; during the second drive, obtaining images periodically, and calculating a second sampling of contrast values from the obtained images; calculating a focusing position from the second sampling of contrast values; and driving the focus lens to the calculated focusing position.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

The present disclosure will now be described more fully with reference to the accompanying drawings, in which example embodiments of the disclosure are shown. In the drawings, like reference numerals refer to the like elements.

Figure 1:
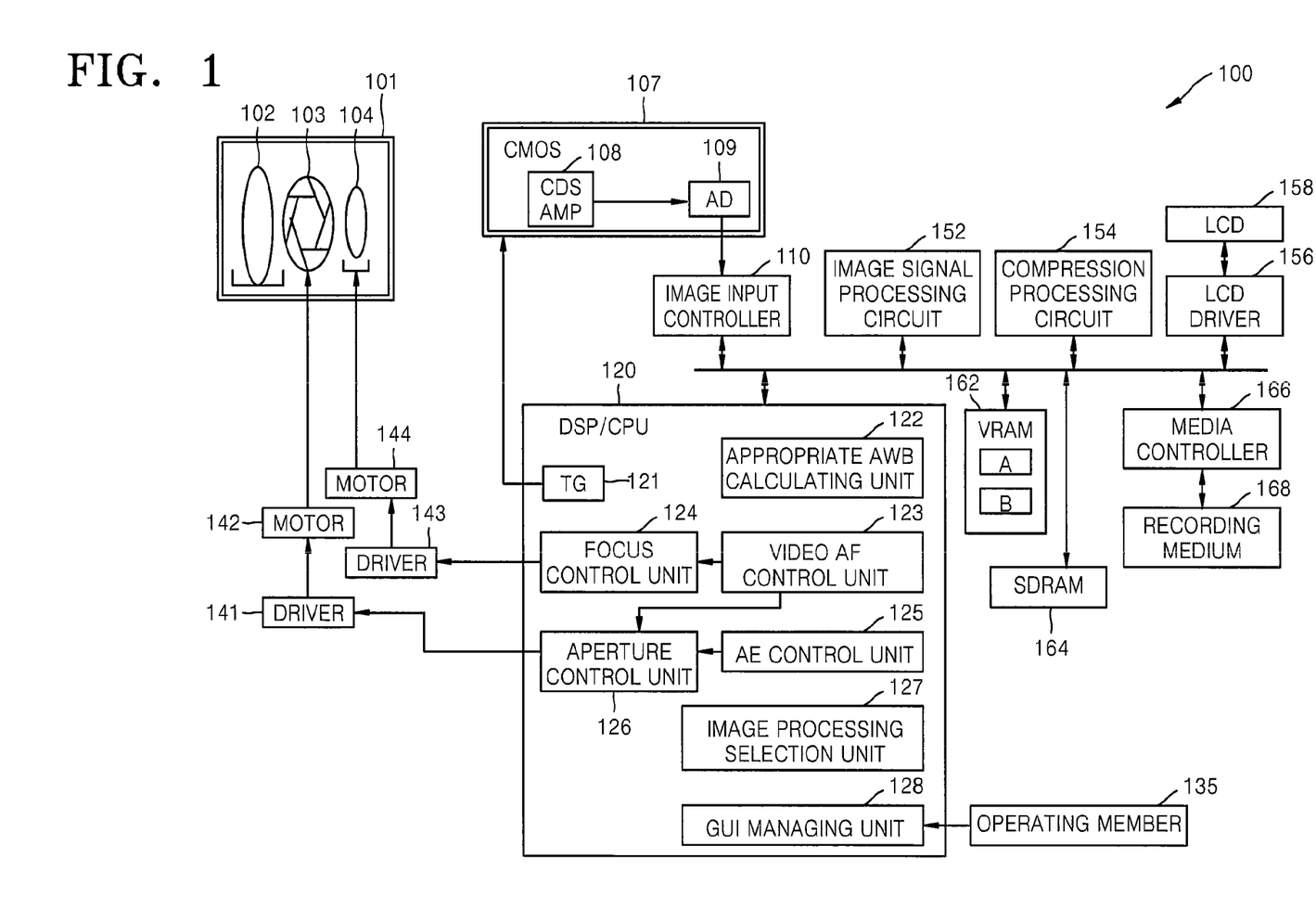
FIG. 1 is a block diagram of an example of an imaging apparatus according to an embodiment of the present invention.

FIG. 1 is a block diagram of an example of the imaging apparatus 100. As illustrated the imaging apparatus 100 is a compact digital still camera. Examples of an imaging apparatus 100, include but are not limited to, a compact digital still camera, video camera, and personal digital assistant. The imaging apparatus 100 includes an optical image forming system 101, an imaging device 107, an image input controller 110, a digital signal processing (DSP)/central processing unit (CPU) 120, an operating member 135, drivers 141 and 143, motors 142 and 144, an image signal processing circuit 152, a compression processing circuit 154, a liquid crystal display (LCD) driver 156, an LCD 158, a video RAM (VRAM) 162, a synchronous dynamic random access memory (SDRAM) 164, a media controller 166, and a recording medium 168.

The optical image forming system 101 may be formed of, for example, a zoom lens 102, an aperture 103, and a focus lens 104. The optical image forming system 101 is a system for forming an image on the imaging device 107 from optical information received from outside and allows light reflected from the subject to penetrate to the imaging device 107. The zoom lens 102 changes the focal length so as to change a viewing angle. The aperture 103 is an opening that can be adjusted to allow different quantities of light to penetrate to the imaging device 107 and is driven by the motor 142. The focus lens 104 moves in an optical axis direction and focuses the subject on an image surface of the imaging device 107. The focus lens 104 is driven by the motor 144. The motors 142 and 144 are driven by respectively receiving driving signals from the drivers 141 and 143.

The imaging device 107 is an example of a photoelectric conversion device which performs photoelectric conversion from light penetrating the optical image forming system 101 and being incident on the imaging device 107, to electric signals. The imaging device 107 includes a device that generates electric signals from incident light. Examples of the device that converts light to electrical signals, include but are limited to, a charge coupled device (CCD) sensor and a complementary metal oxide semiconductor (CMOS) sensor.

In addition, in order to control an exposure time of the imaging device 107, a mechanical shutter (not illustrated) may be applied to the imaging device 107 so as to block light when there is no capturing being performed and to allow light to reach the imaging device 107 only when capturing is being performed. However, the disclosure is not limited thereto and an electric shutter (not illustrated) may be applied to the imaging device 107. The mechanical shutter or the electric shutter may be operated by a shutter button switch (operating member 135) connected to the DSP/CPU 120.

Moreover, the imaging device 107 includes a correlated double sampling (CDS) amplifier (AMP) member 108 and an analog/digital (A/D) converter 109. The CDS/AMP member 108 simultaneously removes low-frequency noise included in the electric signals output from the imaging device 107 and amplifies the electric signal to an arbitrary level. The A/D converter 109 converts the electric signals output from the CDS/AMP member 108 to generate digital signals. The A/D converter 109 outputs the generated digital signals to the image input controller 110.

The image input controller 110 processes the digital signals output from the A/D converter 109 and generates image signals capable of processing an image. The image input controller 110 outputs the generated image signals to, for example, the image signal processing circuit 152. Also, the image input controller 110 controls reading and recording of image data in the SDRAM 164.

The DSP/CPU 120 functions as a processing unit and a control unit by an operational program and controls processing of each element included in the imaging apparatus 100. The DSP/CPU 120 outputs signals to the drivers 141 and 143 and drives the optical image forming system 101 based on, for example, focus control or exposure control. In addition, the DSP/CPU 120 controls each element included in the imaging apparatus 100 based on the signals from the operating member 135. In the present embodiment, one DSP/CPU 120 is disposed. However, a number of CPUs may be included so as to execute commands of a signal system and an operation system in separate CPUs.

As illustrated in FIG. 1, the DSP/CPU 120 includes a timing generator (TG) 121, an appropriate auto white balance (AWB) calculating unit 122, a video auto focus (AF) control unit 123, a focus control unit 124, an auto exposure (AE) control unit 125, an aperture control unit 126, an image processing selection unit 127, and a graphic user interface (GUI) managing unit 128.

The TG 121 outputs timing signals to the imaging device 107 or the CDS/AMP member 108 and controls the exposure time of each pixel forming the imaging device 107 or controls reading out of electric charge.

The appropriate AWB calculating unit 122 calculates a WB control value based on color information of the image signals according to the subject received from the imaging device 107. The appropriate AWB calculating unit 122 calculates the WB control value so as to obtain an appropriate WB according to the subject. The appropriate AWB calculating unit 122 sends the calculated WB control value to the image signal processing circuit 152.

The video AF control unit 123 is an example of a focusing position detector and calculates the focusing position of the focus lens 104 based on an AF evaluation value calculated in the image signal processing circuit 152. The AF evaluation value is calculated by the image signal processing circuit 152 based on a luminance value of the image signals. The AF evaluation value is, for example, a contrast value of an image. When the contrast value reaches a peak, it is determined that the subject is focused on the imaging surface of the imaging device 107 (contrast determining method).

When the focus control unit 124 receives a focus control initiation operating signal, the focus control unit 124 generates a control signal for moving the focus lens 104 in one direction and outputs the generated control signal to the driver 143. The driver 143 generates a driving signal based on the control signal received from the focus control unit 124. The driver 143 sends the generated driving signal to the motor 144. While performing focus control, the driver 143 and the motor 144 drive the focus lens 104 in an optical axis direction as a first drive, and drive the focus lens 104 with respect to a position where the contrast value is at the peak in the first drive, and its nearby position, in an optical axis direction as a second drive. The driver 143 and the motor 144 are examples of a focus lens driving unit.

The AE control unit 125 calculates an aperture value and shutter speed of the aperture 103 based on an AE evaluation value calculated in the image signal processing circuit 152. The AE evaluation value is calculated in the image signal processing circuit 152 based on the luminance value of the image signals. The AE control unit 125 outputs the aperture value obtained as a result of the calculation to the aperture control unit 126.

The aperture control unit 126 outputs the obtained aperture value to the driver 141 as a control signal. The aperture control unit 126 controls the quantity of light incident on the imaging surface from the subject during the first drive based on the predetermined aperture value and controls the quantity of light during the second drive based on the aperture value used when capturing an image of the subject. The driver 141 generates the driving signal based on the control signal received from the aperture control unit 126. The driver 141 outputs the generated driving signal to the motor 142.

The image processing selection unit 127 determines whether to perform image processing such as gamma correction and outline sharpening or sets parameters for each image processing operation. The image processing selection unit 127 outputs the result of determination or the set parameters to the image signal processing circuit 152.

The GUI managing unit 128 manages a GUI of thumbnail screens of images displayed on the LCD 158 or a menu screen for operating the imaging apparatus 100. The GUI managing unit 128 receives an operation signal from the operating member 135 and transmits a control signal based on the operation signal to the LCD driver 156.

The operating member 135 may include a 4-direction key, a power switch, mode dials, and a shutter button disposed in the imaging apparatus 100. The operating member 135 transmits the operation signal based on operations performed by a user to the DSP/CPU 120. For example, the shutter button may be half-pressed, fully pressed, or released by the user. When the shutter button is half-pressed (S1 operation), the focus control initiation operating signal is output and the shutter button is released to cancel focus control. Also, when the shutter button is fully pressed (S2 operation), a capturing initiation control signal is output.

The image signal processing circuit 152 receives the image signals from the image input controller 110 and generates image processed image signals based on the WB control value, a gamma ($\gamma$) value, and an outline sharpening control value. The image signal processing circuit 152 is an example of a contrast value calculating unit, which calculates the AE evaluation value and the AF evaluation value based on the image signals, and which respectively sends the AE evaluation value and the AF evaluation value to the DSP/CPU 120.

The compression processing circuit 154 receives the image signals and compresses the image signals using a compression method such as JPEG compression or Lempel-Ziv-Welch (LZW) compression. The compression processing circuit 154 outputs image data generated by compression processing to the, for example, media controller 166.

The LCD driver 156 receives the image data from, for example, the VRAM 162, and displays an image on the LCD 158. The LCD 158 is an example of a display unit and is disposed in a body of the imaging apparatus 100. The image displayed on the LCD 158 may include, for example, an image read from the VRAM 162 (live view display) before being captured, various setting screens of the imaging apparatus 100, or an image captured and recorded. In the present embodiment, the LCD 158 is disposed as a display unit and the LCD driver 156 is disposed as a display operating unit. Another example of the display unit and the display operating unit, is an organic EL display and its display operating unit.

The VRAM 162 is a memory for displaying an image and has various channels. The VRAM 162 may simultaneously perform input of the image data for displaying an image and output of the image data to the LCD driver 156. The resolution or the maximum number of colors of the LCD 158 is dependent upon the capacity of the VRAM 162.

The SDRAM 164 temporarily stores image data of captured images. The SDRAM 164 has sufficient memory capacity to store image data of various images. Also, the SDRAM 164 sequentially maintains the image signals while performing focus control so as to output the image signals. In addition, the SDRAM 164 stores an operational program of the DSP/CPU 120. Reading and recording of the images in the SDRAM 164 are controlled by the image input controller 110.

The media controller 166 controls recording of the image data to the recording medium 168 or reading of the image data or setting information recorded to the recording medium 168. The recording medium 168 may be, for example, an optical disc (CD, DVD, or blue ray disc), a magneto-optical disc, a magnetic disc, or a semiconductor memory medium, and records the captured image data. The media controller 166 and the recording medium 168 may be removed from or attached to the imaging apparatus 100

A series of processing operations in the imaging apparatus 100 may be performed in hardware or software by programs on a computer.

A focus control operation of the imaging apparatus 100 according to an example of an embodiment will now be described. According to the focus control operation of the present example, two steps of operations are performed, as will be described later, and thus, a high precision focusing position may be determined.

First, the imaging apparatus 100 controls the imaging device 107 (for example, a CCD), when the power is turned on, and exposes the imaging device 107 in a predetermined interval, thereby reading the image data. The predetermined interval is for example, a unit of $\frac{1}{30}^{th}$ of a second and the image read in the predetermined interval is referred to as one frame. The images in each one frame are displayed in real time on, for example, the LCD 158 installed on the rear surface of the imaging apparatus 100.

In addition, the imaging apparatus 100 calculates the luminance value of the subject from the image data. A method of calculating a luminance value may be any general method and thus a detailed description of the method will be omitted here. While the images are displayed in real time, the imaging apparatus 100 performs exposure control for the entire screen to have appropriate brightness with reference to luminance information of the entire screen.

Figure 2:
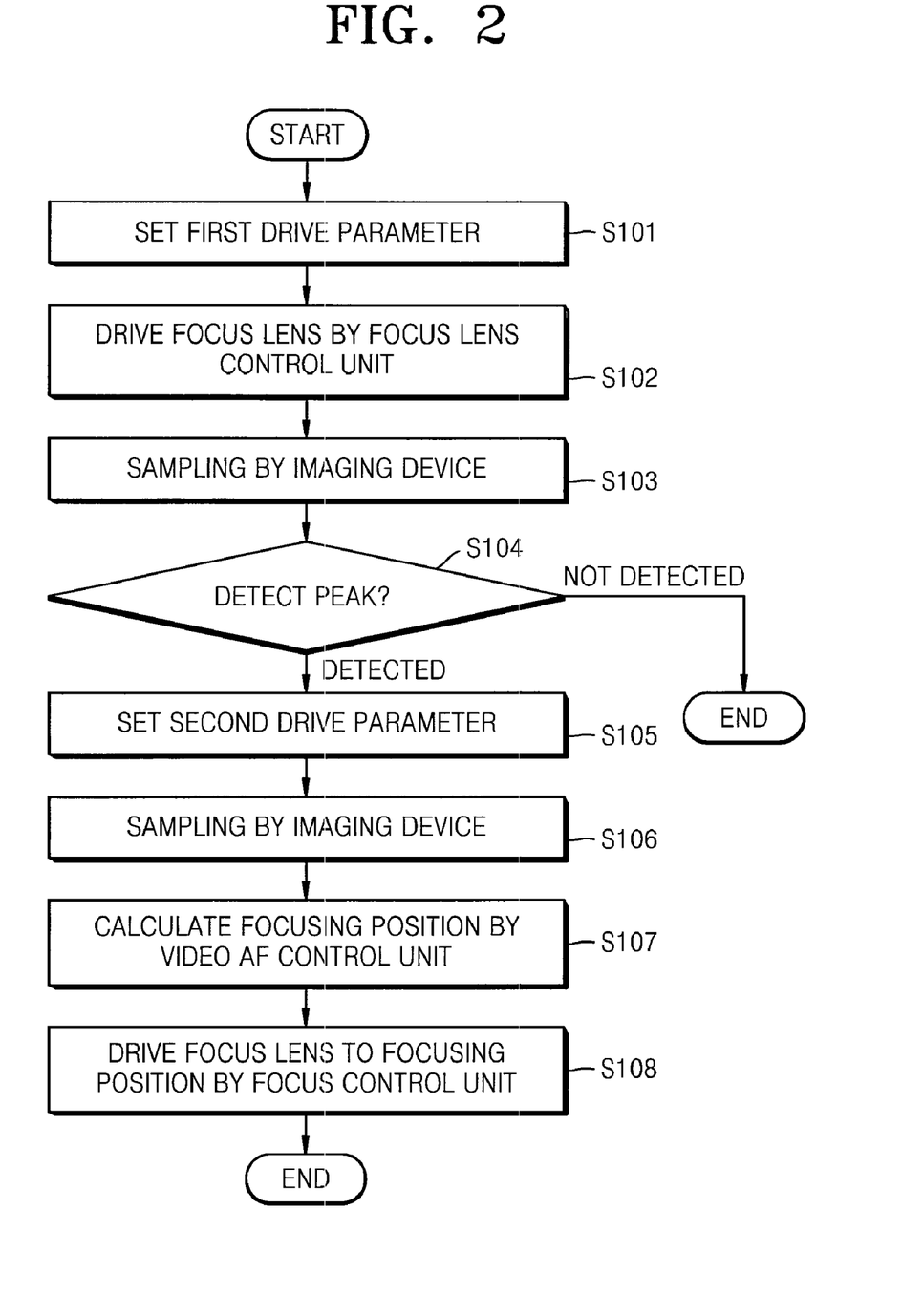
FIG. 2 is a flowchart illustrating an example of a focus control operation performed in the imaging apparatus of FIG. 1.

Then, the shutter button is half-pressed (S1 operation) by, for example, a user and the focus control operation is initiated, as described with reference to FIG. 2. FIG. 2 is a flowchart illustrating an example of a focus control operation performed by the imaging apparatus of FIG. 1. In operation 101, the parameters for the first drive are set. Here, the first drive denotes a scanning operation for calculating the AF evaluation value while moving the focus lens 104 from a position at which infinity distance capturing is performed to a position at which hyperfocal distance capturing is performed.

The parameters set for the first drive may be, for example, a sampling interval and an aperture. The sampling interval is an interval in the position of the focus lens 104 when the luminance signal is obtained for calculating the AF evaluation value. The sampling interval during the first drive may be, for example, wider than the sampling interval during the second drive. The aperture during the first drive may be, for example, opened.

When the focus control is initiated, the focus lens 104 is driven at a fixed speed in connection with the control of the imaging device 107. For example, the focus lens 104 is driven to the $\infty$ end in infinity distance capturing and then is driven from the $\infty$ end in infinity distance capturing to the near-end in hyperfocal distance capturing, in operation 102.

The contrast value (AF evaluation value) is calculated and sampled based on the image data read from the imaging device 107 by exposing the subject to the imaging device 107, in operation 103.

After the sampling process, whether a peak of the AF evaluation value is detected is determined, in operation 104. In an embodiment, when a number of peaks are detected, the subject located nearest to the imaging apparatus 100 is determined as a main subject and the peak corresponding to the main subject is determined as a target peak in the second drive. When the peak of the AF evaluation value is not detected in the subject (for example, a contrast change is limited in the subject), the focus control operation is completed.

When the peak of the AF evaluation value is detected in the first drive, parameters for the second drive are set, in operation 105. Here, the second drive denotes a scanning operation for calculating the AF evaluation value while moving the focus lens 104 within a range close to the target peak determined to correspond to the main subject during the first drive.

The parameters set for the second drive may be, for example, the sampling interval and the aperture value. The sampling interval is an interval in the position of the focus lens 104 when the luminance signal is obtained for calculating the AF evaluation value. The sampling interval during the second drive may be, for example, smaller than the sampling interval during the first drive. Also, the aperture value during the second drive may be, for example, an aperture value used when capturing an image.

The focus lens 104 is driven from in front of the focus lens position of the target peak determined during the first drive. Then, the contrast value (AF evaluation value) is calculated and sampled based on the image data read from the imaging device 107 by exposing light reflected from the subject to the imaging device 107, in operation 106. Moreover, when the focus lens 104 is driven during the first drive from the position at which infinity distance capturing is performed to the position at which hyperfocal distance capturing is performed, the focus lens 104 is driven during the second drive from the position at which hyperfocal distance capturing is performed to the position at which infinity distance capturing is performed.

In the second drive, the focus lens 104 is driven to the inside of the focus lens position of the target peak determined during the first drive. In an embodiment, the AF evaluation value is calculated using the aperture value used when capturing an image and the sampling interval in the second drive until the focus lens 104 reaches the inside of the focus lens position of the target peak determined during the first drive.

Then, the video AF control unit 123 calculates the focus lens position as a final focusing position using the maximum AF evaluation value (peak value) from among the AF evaluation value calculated in the second drive in operation 107. For example, since the AF evaluation values obtained by sampling are discretely obtained, the focus lens position may be determined as the focusing position. Also, in order to accurately calculate the focusing position, the peak and the AF evaluation values before and after the peak are extracted and interpolation calculation may be performed using the AF evaluation values. The final focusing position is calculated by the interpolation calculation.

Then, the focus control unit 124 drives the focus lens 104 to the calculated focusing position. As such, a series of operations for performing focus control are completed, in operation 108. Then, as the shutter button is fully pressed (S2 operation), the capturing of an image is performed based on the result obtained by performing the focus control.

In the embodiment described above, the focusing position is detected by using the aperture value used when capturing an image during the second drive. Since the aperture value used in the second drive is used in the capturing, the high precision focusing position may be detected even when a lens, in which the focusing position is changed by a change of the aperture value, is used.

Figure 3:
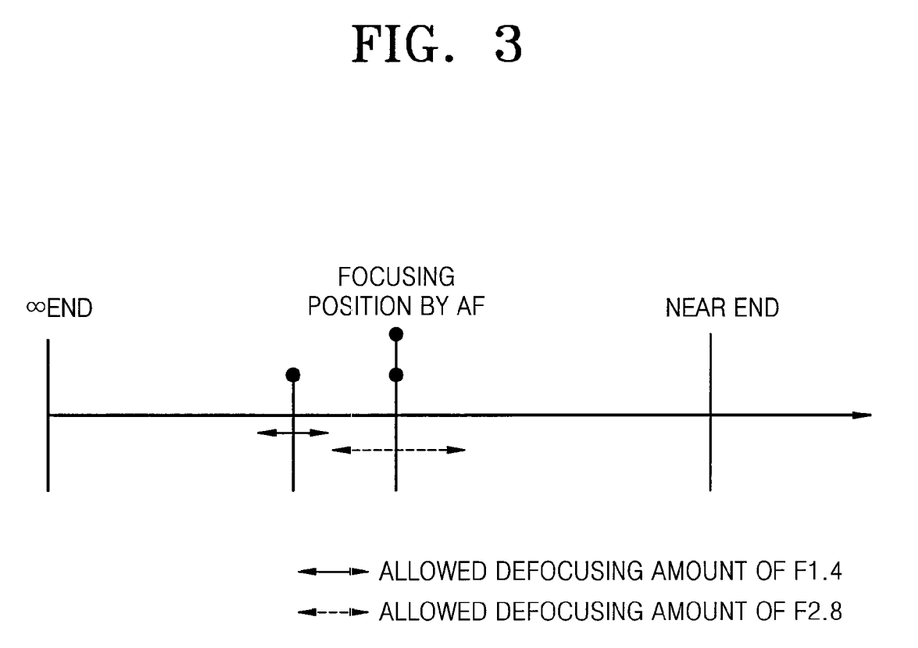
FIG. 3 illustrates example positions of a focus lens.

An example of capturing with an aperture value of F2.8 is described with reference to FIG. 3. FIG. 3 illustrates example positions of a focus lens. The focus lens may be driven between a position (∞ end) when infinity distance capturing is performed and a position (near-end) when hyperfocal distance capturing is performed. In the present example, the aperture is opened and focus is controlled in the first drive. However, in the second drive, the aperture having an aperture value of F2.8 used when capturing an image is used for performing focus control. Accordingly, the focusing position when the aperture value is F2.8 is calculated in the second drive. As a result, the focus lens 104 may be driven while the capturing based on the focusing position obtained during the second drive is performed.

Although the focusing positions are not matched according to the aperture values in a lens, the focusing position calculated by performing focus control as illustrated in FIG. 3 and the focusing position required when capturing an image may be matched to each other.

Moreover, in embodiments, the focus lens 104 may be driven with one step of operation using the aperture value used when capturing an image, instead of two steps of operations formed of the first drive and the second drive. When the focus lens 104 is driven with two steps of operations, the aperture value used when capturing an image during the first drive may be used.

In addition, in the present embodiment, when the depth of field is small due to opening of the aperture or reducing an amount by which the aperture is narrowed down during the first drive and when an exposure condition is appropriate, the peak of the AF evaluation value may be calculated. Also, since the aperture is narrowed using the aperture value used when capturing an image during the second drive, the focusing positions may be prevented from being mismatched with each other and thus an accurate focusing position may be detected. In addition, as the size of the imaging device is small and a pixel pitch is small, focusing precision needs to be improved. However, in the present embodiment, the focusing position may be precisely determined.

Since the two steps of the operations are used, an approximate sampling interval is used in the first drive and a narrowed sampling interval capable of improving the precision may be used in the second drive so that the time taken to perform focus control is not long.

The aperture is set using the aperture value used when capturing an image while performing focus control during the second drive. Accordingly, in the present embodiment, when the shutter button is fully pressed and the capturing is initiated, the aperture may not be changed to the aperture used when capturing an image and thus the time taken for the capturing may be reduced.

Figure 4:
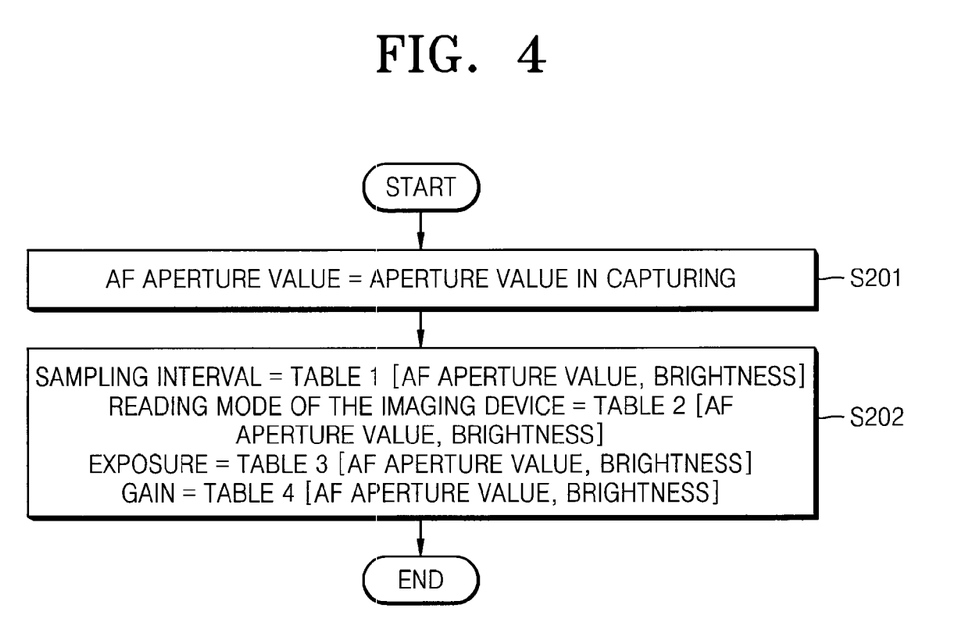
FIG. 4 is a flowchart illustrating an example of setting operation of second drive parameters, performed in the image apparatus of FIG. 1.

Then, setting of the second drive parameters according to an embodiment is now described with reference to FIG. 4. FIG. 4 is a flowchart illustrating an example of the setting operation of the second drive parameters.

In operation 201, when performing AE control, the aperture value when capturing an image obtained by AE control is set to the AF aperture value for performing focus control in the second drive. In addition, when the aperture value is determined by a user, that is in a manual control, the aperture value when capturing an image is set to the AF aperture value for performing focus control in the second drive.

Then, in operation 202, at least any one of the sampling interval, a reading mode of the imaging device, exposure, and a gain is determined based on two conditions of brightness respectively obtained by using the AF aperture value and by performing the exposure control. For example, in order to improve precision of reading of the contrast value obtained from the luminance signal or to improve the size of the value, the AF aperture value, the sampling interval in response to brightness, the reading mode of the imaging device, the exposure, and the gain are interlocked with each other. Accordingly, the focusing position may be precisely detected. Also, according to the condition, the time taken for determining of the focusing position may be reduced.

Determination of the sampling interval, the reading mode of the imaging device, the exposure, and the gain may be performed with reference to Table 1, Table 2, Table 3, and Table 4 (not shown) in which the sampling interval, the reading mode of the imaging device, the exposure, and the gain are previously recorded. Also, numerical expressions may be previously recorded, instead of the tables, and the sampling interval, the reading mode of the imaging device, the exposure, and the gain may be calculated. Also, an interpolation calculation may be performed with respect to the values referred to in the tables.

The brightness obtained by performing exposure control may be obtained from, for example, the imaging device 107 or a sensor for performing exposure control. The reading mode of the imaging device is denoted as a signal processing mode when image data is read from, for example, the imaging device 107, and is a process of adding pixels, when the subject is dark, and directly reading all of the pixels or reading by reducing the number of the pixels, when the subject is bright. Since the number of the pixels are reduced and read, the result of the contrast value may be affected without affecting the exposure condition.

Figure 5:
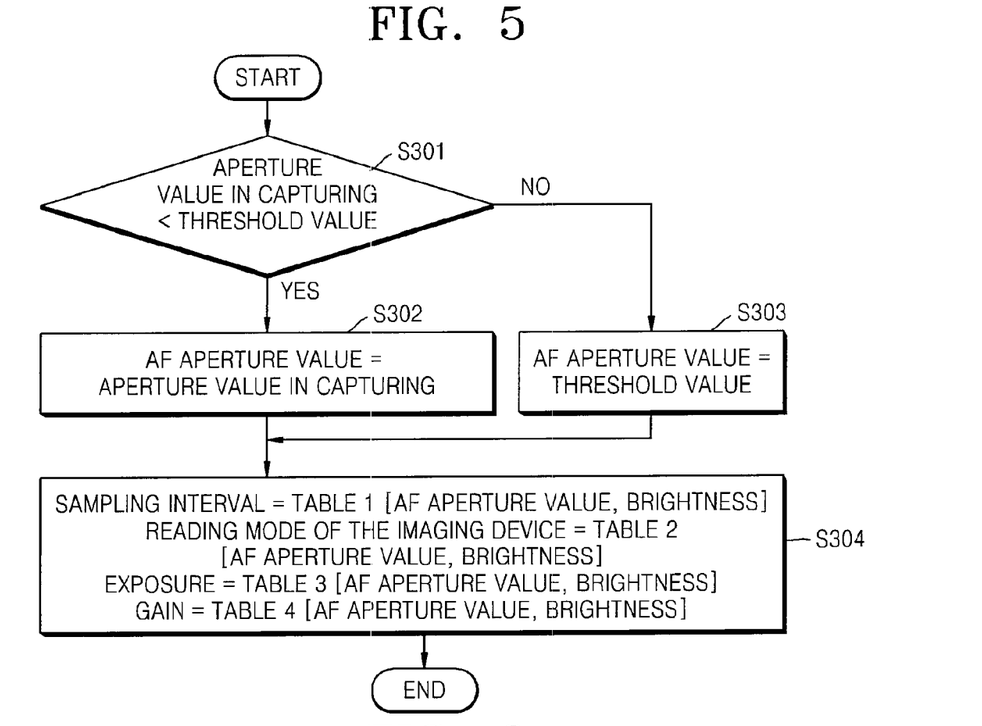
FIG. 5 is a flowchart illustrating an example of a setting operation of second drive parameters.

Setting of the second drive parameters according to another embodiment will now be described with reference to FIG. 5. FIG. 5 is a flowchart illustrating an example of the setting operation of the second drive parameters.

When performing AE control, the aperture value used when capturing an image, which is obtained by exposure control, is obtained. In addition, when the aperture value is determined by a user, that is in a manual control, the aperture value used when capturing an image is obtained. Then, the obtained aperture value is compared with a predetermined threshold value, in operation 301. When the aperture value is less than the predetermined threshold value, the obtained aperture value used when capturing an image is determined as the AF aperture value while performing focus control during the second drive, in operation 302.

When the aperture value is not less than the predetermined threshold value, the threshold value is determined as the AF aperture value while performing focus control during the second drive, in operation 303. Moreover, a predetermined positive number, instead of the threshold value, may be determined as the AF aperture value. Since the aperture value used when capturing an image is greater than the predetermined threshold value, when the aperture 103 is narrowed down, the AF aperture value may be limited. As a result, the AF evaluation value may be obtained without being deteriorated and thus, the focusing position may be easily detected. Also, the focus control is performed when the aperture is narrowed instead of when the aperture is opened, and the focusing position when capturing an image and the focusing position while performing focus control may be prevented from being mismatched with each other. Moreover, the threshold value may be determined according to conditions such as performance of the lens, a modulation transfer function (MTF) of an optical system, or a sampling speed.

Then, at least one of the sampling interval, the reading operation of the imaging device, the exposure, and the gain is determined based on two conditions of brightness respectively obtained by using the AF aperture value and performing exposure control, in operation 304. Operation 304 is the same as the operation 202 in the previous embodiment and thus detailed description thereof is omitted.

Figure 6:
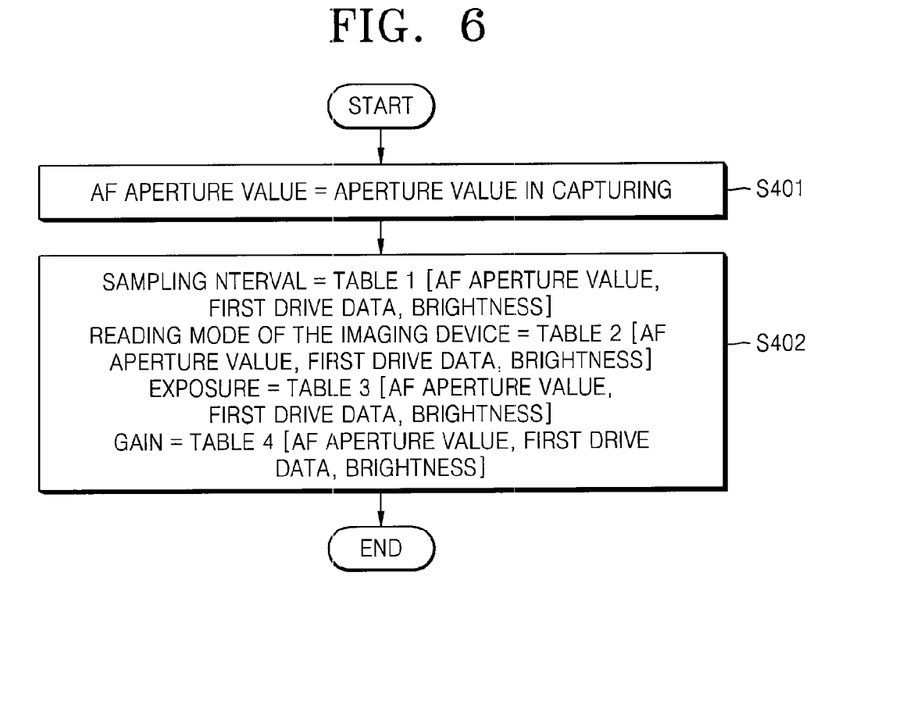
FIG. 6 is a flowchart illustrating an example of setting operation of second drive parameters.

Setting of the second drive parameters according to another embodiment will now be described with reference to FIG. 6. FIG. 6 is a flowchart illustrating an example of the setting operation of the second drive parameters.

When performing AE control, the aperture value used when capturing an image obtained by performing exposure control is determined as the AF aperture value while performing focus control during the second drive, in operation 401. In addition, when the aperture value is determined by a user, that is in a manual control, the aperture value used when capturing an image is set to the AF aperture value for performing focus control in the second drive.

Then, in operation 402, at least one of the sampling interval, the reading mode of the imaging device, the exposure, and the gain is determined based on three conditions of brightness respectively obtained by using the AF aperture value, the AF evaluation value during the first drive (a first drive data), and performing exposure control. Since the AF aperture value, the first drive data, the sampling interval in response to brightness, the reading mode of the imaging device, the exposure, and the gain are interlocked with each other and thus precision of reading of the contrast value obtained from the luminance signal or the size of the contrast value is changed, the focusing position may be precisely detected. Also, according to the condition, the time taken to detect the focusing position may be reduced.

In the present embodiment, since the two steps of the operations are used, the AF evaluation value during the first drive may be included in the condition for setting the parameters. Accordingly, since the parameters may be determined in consideration of the distribution of the AF evaluation values during the first drive, more appropriate parameters may be determined by detecting the focusing position than those when the parameters are determined based on the two conditions of the AF aperture value and brightness.

Moreover, determination of the sampling interval, the reading mode of the imaging device, the exposure, and the gain may be performed with reference to Table 1, Table 2, Table 3, and Table 4 (not shown) in which the sampling interval, the reading mode of the imaging device, the exposure, and the gain are previously recorded. Also, numerical expressions may be previously recorded, instead of the tables, and the sampling interval, the reading mode of the imaging device, the exposure, and the gain may be calculated.

Figure 7:
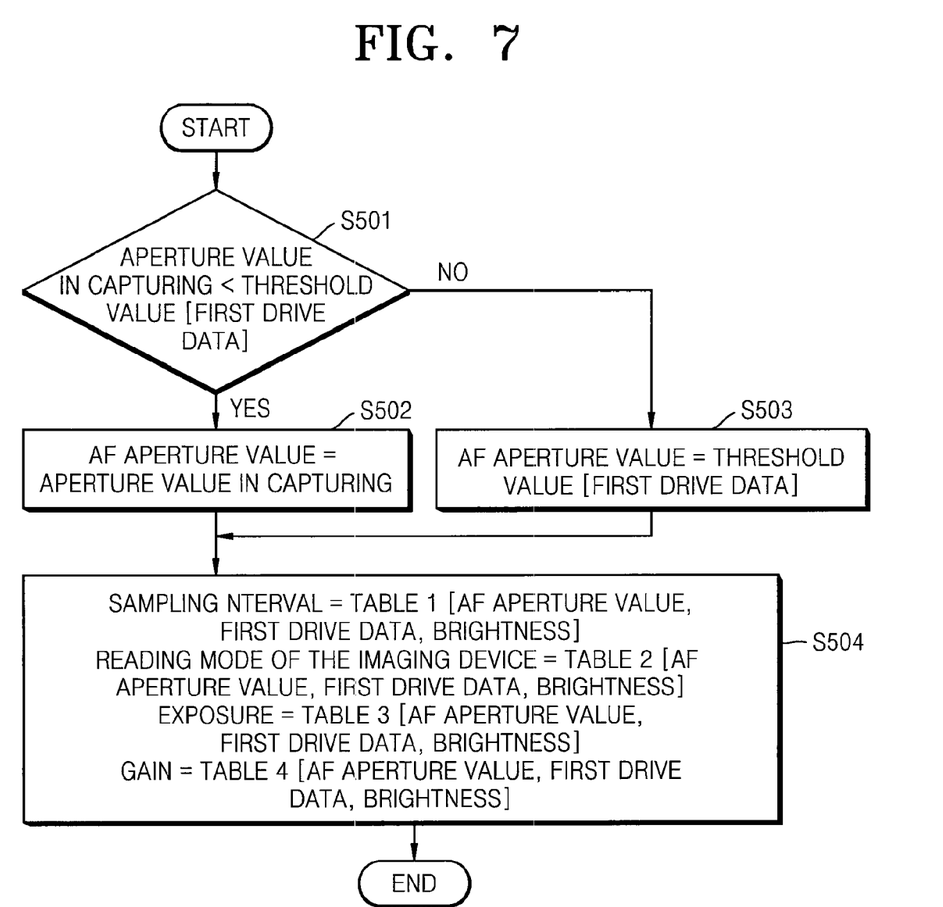
FIG. 7 is a flowchart illustrating an example of setting operation of second drive parameters.

Setting of the second drive parameters according to another embodiment will now be described with reference to FIG. 7. FIG. 7 is a flowchart illustrating an example of the setting operation of the second drive parameters.

When performing AE control, the aperture value used when capturing an image obtained by performing exposure control is obtained. In addition, when the aperture value is determined by a user, that is in a manual control, the aperture value used when capturing an image is obtained. Then, the obtained aperture value is compared with a predetermined threshold value, in operation 501.

The threshold value is determined based on the AF evaluation values (the first drive data) during the first drive. For example, when the AF evaluation values during the first drive are generally low, the threshold may be set to be low and when the AF evaluation values during the first drive are high, the threshold may be set to be high.

When the aperture value used when capturing an image is less than the predetermined threshold value, the obtained aperture value used when capturing an image is determined as the AF aperture value during the second drive, in operation 502. When the aperture value used when capturing an image is not less than the predetermined threshold value, the threshold value is determined as the AF aperture value while performing focus control during the second drive, in operation 503.

Since the aperture value used when capturing an image is not less than the predetermined threshold value, when the aperture 103 is narrowed down, the AF aperture value may be limited. As a result, the AF evaluation value may be obtained without being deteriorated and thus, the focusing position may be easily detected. Also, the focus control is performed when the aperture is narrowed instead of when the aperture is opened, the focusing position when capturing an image and the focusing position while performing focus control may be prevented from being mismatched with each other.

Then, at least one of the sampling interval, the reading operation of the imaging device, the exposure, and the gain is determined based on three conditions of brightness respectively obtained by using the AF aperture value, the first drive data, and the exposure controlling, in operation 504. The operation 504 is the same as the operation 402 in the previous embodiment and thus a detailed description thereof will be omitted here.

For example, in the above embodiments, the first drive denotes that the focus lens 104 is driven from the infinity distance capturing position to the hyperfocal distance capturing position and the second drive denotes that the focus lens 104 is driven from the hyperfocal distance capturing position to the infinity distance capturing position. However, in embodiments, the first drive may denote that the focus lens 104 is driven from the hyperfocal distance capturing position to the infinity distance capturing position and the second drive may denote that the focus lens 104 is driven from the infinity distance capturing position to the hyperfocal distance capturing position.

Figure 8:
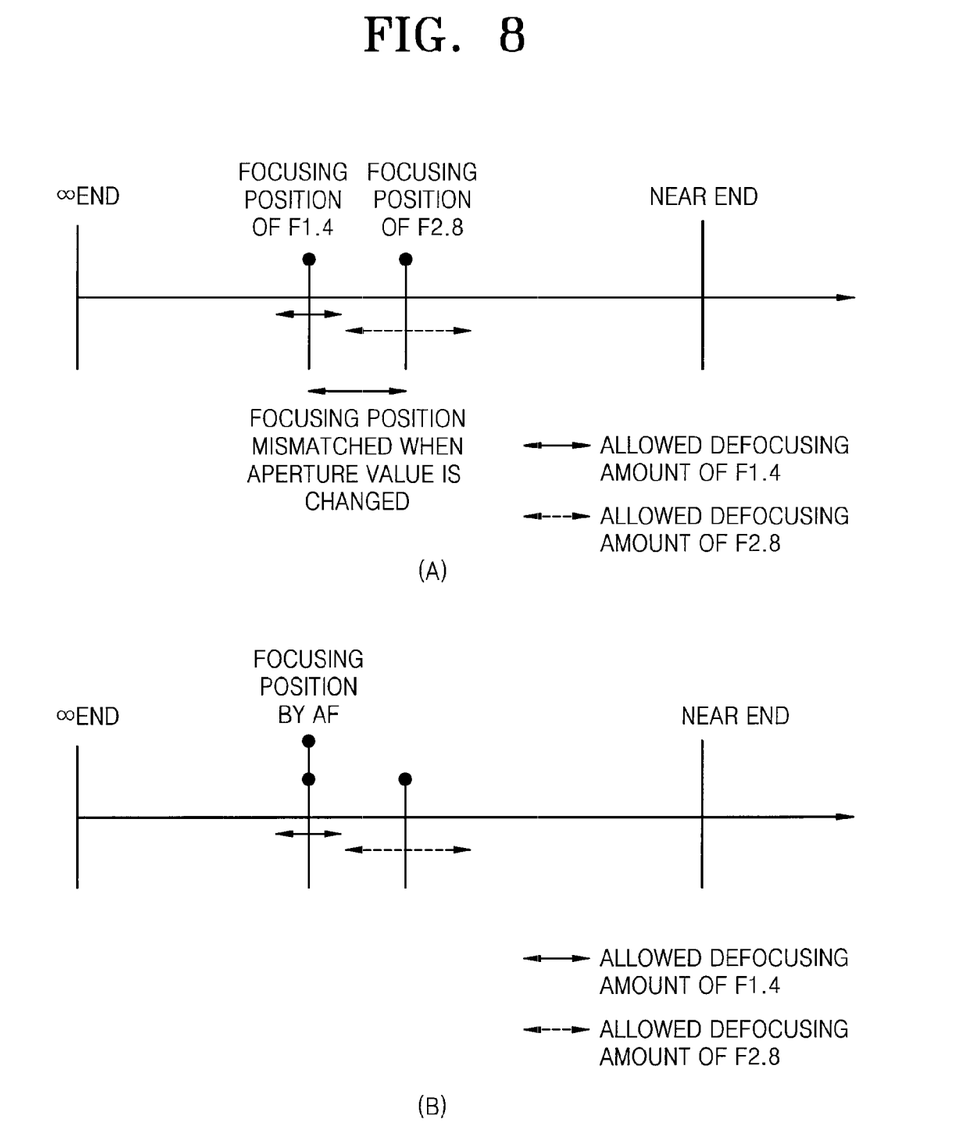
FIGS. 8A and 8B illustrate example positions of a focus lens.

FIGS. 8A and 8B illustrate example positions of a focus lens. When an aperture is narrowed, the depth of field increases so as to increase an allowed defocusing amount and thus, it is difficult to identify an out of focus state. The focusing positions are not matched for the aperture values F1.4 and F2.8 for a particular lens. For example, when an aperture value is set to F2.8 while capturing with reference to FIGS. 8A and 8B and when the aperture value was set to F1.4 for focusing.

However, in the lens in which the focusing positions are not matched for different aperture values, when the aperture value when capturing is, for example, F2.8, and is different from the aperture value when performing focus control, the focusing position calculated by performing focus control and the focusing position required when capturing are not matched with each other, as illustrated in FIG. 8B. Also, in FIGS. 8A and 8B, a range of the allowed defocusing amount of the aperture value F1.4 is in the position being out of the allowed defocusing amount of the aperture value F2.8 so that back focusing may occur when capturing with F2.8 with the focus set for F1.4 and thus the subject is out of focus.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A focusing position determining apparatus comprising:
 a photoelectric conversion device configured to convert light from a subject incident on an imaging surface into an electric signal;
 a focus lens configured to focus the light from the subject onto the imaging surface;
 a contrast value calculating unit configured to calculate a contrast value in an image signal from the electric signal;
 a focusing position detector configured to determine a focusing position of the focus lens when the light from the subject is focused on the imaging surface by using a peak of the contrast value;
 a focus lens driving unit configured to drive the focus lens through a first range of positions as a first drive and configured to drive the focus lens through a second range of positions as a second drive, wherein the second range is based on a position of the location of the focus lens where the contrast value is at a peak in the first drive; and
 an aperture control unit configured to control a quantity of light incident on the imaging surface from the subject during the first drive based on a first predetermined aperture value and configured to control the quantity of light based on an aperture value used when capturing an image in the second drive.

2. The apparatus of claim 1, wherein a driving position of the focus lens, where the focusing position detector calculates the contrast value, an exposure condition for the imaging surface, a reading mode of the photoelectric conversion device, and a gain used to calculate the contrast value, are determined based on the aperture value used during the second drive.

3. The apparatus of claim 1, wherein a driving position of the focus lens, where the focusing position detector calculates the contrast value, the exposure condition for the imaging surface, the reading mode of the photoelectric conversion device, and a gain used to calculate the contrast value, are determined based on the contrast value used during the first drive.

4. The apparatus of claim 1, wherein the aperture value used in the second drive is larger than the aperture value used in the first drive.

5. The apparatus of claim 1, wherein the aperture control unit is further configured to set the aperture value in the second drive to the aperture value used when capturing an image if the aperture value used when capturing an image is smaller than a second predetermined aperture value, and configured to set the aperture value in the second drive to the second predetermined aperture value if the aperture value used when capturing an image is not smaller than the second predetermined aperture value.

6. The apparatus of claim 1, wherein the range of the second drive is smaller than the range of the first drive.

7. The apparatus of claim 6, wherein a frequency of samples of the contrast values during the second drive is greater than a frequency of samples of the contrast values during the first drive.

8. An imaging apparatus comprising a focusing position determining apparatus comprising:
 a photoelectric conversion device configured to convert light from a subject incident on an imaging surface into an electric signal;
 a focus lens configured to focus the light from the subject onto the imaging surface;
 a contrast value calculating unit configured to calculate a contrast value in an image signal from the electric signal;
 a focusing position detector configured to determine a focusing position of the focus lens when the light from the subject is focused on the imaging surface by using a peak of the contrast value;
 a focus lens driving unit configured to drive the focus lens through a first range of positions as a first drive and configured to drive the focus lens through a second range of positions as a second drive, wherein the second range is based on a position of the location of the focus lens where the contrast value is at a peak in the first drive; and
 an aperture control unit configured to control a quantity of light incident on the imaging surface from the subject during the first drive based on a predetermined aperture value and configured to control the quantity of light based on an aperture value used when capturing an image in the second drive.

9. A focusing position determining method, the method comprising:
 setting an aperture to a first aperture value;
 driving a focus lens through a first range of positions as a first drive;
 during the first drive, obtaining images periodically, and calculating a first sampling of contrast values from the obtained images;
 calculating a first focus position from the first sampling of contrast values;
 setting the aperture to a second aperture value;
 driving the focus lens through a second range of positions as a second drive, the second range of positions being based on the first focus position;
 during the second drive, obtaining images periodically, and calculating a second sampling of contrast values from the obtained images;
 calculating a focusing position from the second sampling of contrast values; and
 driving the focus lens to the calculated focusing position.

10. The method of claim 9, wherein calculating a first focus position further comprises:
 calculating a first focus position from the first sampling of contrast values as the position corresponding to a peak contrast value.

11. The method of claim 9, wherein setting the aperture to a second aperture value further comprises:
 comparing a predetermined aperture value and an aperture value used when capturing an image;
 setting the aperture to the aperture value used when capturing an image if the aperture value used when capturing an image is smaller than the predetermined aperture value as the second aperture value;
 setting the aperture to the predetermined aperture value if the aperture value used when capturing an image is not smaller than the predetermined aperture value as the second aperture value.

12. The method of claim 9, wherein the first range of positions is substantially the full range of motion of the focus lens.

13. The method of claim 9, wherein driving the focus lens through a second range further comprises:
 driving the focus lens through a second range of positions as a second drive, the second range of positions being based on the first focus position, wherein the second range is smaller than the first range.

14. The method of claim 9, wherein an interval between obtaining images during the first drive is greater than an interval between obtaining images in the second drive.

15. The method of claim 9, wherein calculating a focusing position from the second sampling further comprises:
 determining a driving position of the focus lens, where a focusing position detector calculates the contrast value, an exposure condition for an imaging surface, a reading mode of a photoelectric conversion device, and a gain used to calculate the contrast value, based on the second aperture value.

16. The method of claim 9, wherein calculating a focusing position from the second sampling further comprises:
 determining a driving position of the focus lens, where a focusing position detector calculates the contrast value, an exposure condition for an imaging surface, a reading mode of a photoelectric conversion device, and a gain used to calculate the contrast value, based on the contrast value used during the first drive.

17. The method of claim 9, wherein the aperture during the first drive is the first aperture value and the aperture during the second drive is the second aperture value, the second aperture value being narrowed compared to the first aperture value.

18. The method of claim 9, wherein the aperture during the first drive is based on a predetermined aperture value and the aperture during the second drive is based on an aperture value used when capturing an image.

19. The method of claim 11, wherein setting the aperture to a second aperture value further comprises:
 performing an auto exposure (AE) to determine the aperture value used when capturing an image.

20. The method of claim 11, wherein setting the aperture to a second aperture value further comprises:
 setting the aperture value used when capturing an image in response to a received signal from a user.

* * * * *